US010470556B1

(12) United States Patent
Choi

(10) Patent No.: US 10,470,556 B1
(45) Date of Patent: Nov. 12, 2019

(54) BELT HOLDER FOR TAPE MEASURE

(71) Applicant: Jun Young Choi, Seoul (KR)

(72) Inventor: Jun Young Choi, Seoul (KR)

(*) Notice: Subject to any disclaimer, the term of this patent is extended or adjusted under 35 U.S.C. 154(b) by 0 days.

(21) Appl. No.: 16/428,035

(22) Filed: May 31, 2019

(30) Foreign Application Priority Data

Nov. 19, 2018 (KR) .......................... 10-2018-0142238

(51) Int. Cl.
*G01B 3/10* (2006.01)
*A45F 5/02* (2006.01)

(52) U.S. Cl.
CPC ............ *A45F 5/021* (2013.01); *G01B 3/1041* (2013.01); *G01B 3/1071* (2013.01); *A45F 2200/0575* (2013.01); *G01B 2003/1048* (2013.01); *G01B 2003/1074* (2013.01)

(58) Field of Classification Search
CPC ...................................................... A45F 5/021
USPC .................... 33/758, 759, 760, 768; 224/904
See application file for complete search history.

(56) References Cited

U.S. PATENT DOCUMENTS

| | | | | |
|---|---|---|---|---|
| D196,542 S * | 10/1963 | Zelnick | ...................... | A45F 5/02 D3/228 |
| D221,123 S * | 7/1971 | Nicholas | ................... | A45F 5/02 D3/228 |
| 4,598,027 A * | 7/1986 | Johnson | ..................... | A45F 5/02 156/212 |
| 4,821,933 A * | 4/1989 | Seber | ........................ | A45F 5/02 224/248 |
| 5,213,240 A * | 5/1993 | Dietz | ........................ | A45F 5/02 224/183 |
| 5,388,741 A * | 2/1995 | Hillinger | ................... | A45F 5/02 206/349 |
| 9,173,475 B2 * | 11/2015 | Blechman | ................. | A45F 5/02 |
| 9,248,565 B1 * | 2/2016 | Latham | ................. | B25H 3/006 |
| 10,182,641 B1 | 1/2019 | Goodman | | |
| 2003/0074803 A1 * | 4/2003 | Mutai | ....................... | A45F 5/02 33/768 |
| 2005/0284909 A1 * | 12/2005 | Munoz | ..................... | A45C 1/04 224/674 |
| 2008/0283563 A1 | 11/2008 | O'Donnell et al. | | |
| 2012/0260513 A1 | 10/2012 | Daugherty et al. | | |
| 2018/0184791 A1 * | 7/2018 | Davis | ........................ | A45F 5/02 |

FOREIGN PATENT DOCUMENTS

KR        10-0760086 B1    9/2007

* cited by examiner

*Primary Examiner* — George B Bennett
(74) *Attorney, Agent, or Firm* — Paratus Law Group, PLLC

(57) ABSTRACT

Disclosed is a belt holder for a tape measure, including: a holder body mounted on the belt; a rotatable holding part having a clip-through hole through which the belt clip of the tape measure passes formed in a vertical direction and rotatably coupled to a front surface of the holder body in order to hold the tape measure by hanging the tape measure; a locking bracket having a locking jaw formed to prevent the belt clip from being removed from the clip-through hole of the rotatable holding part that is rotated with respect to the holder body and slidably provided in the holder body; and a restoring spring resiliently supporting the locking bracket so that the locking jaw of the locking bracket is positioned to prevent the belt clip from being removed.

5 Claims, 6 Drawing Sheets

BELT HOLDER FOR TAPE MEASURE

CROSS REFERENCE TO RELATED APPLICATION

The present application claims priority to Korean Patent Application No. 10-2018-0142238, filed Nov. 19, 2018, the entire contents of which is incorporated herein for all purposes by this reference.

BACKGROUND

The present invention relates to a belt holder and, more particularly, to a belt holder for a tape measure that is mounted on a belt to hold a tape measure by hanging the tape measure on the belt.

Using a tape measure, it is easy to measure a length longer than the operator's arm, and the tape measure is widely used on construction sites because the tape measure is very convenient to carry.

Since the tape measure is frequently used at construction sites, a worker carries the tape measure while holding the tape measure by hanging the same on his/her belt. In order to easily carry the tape measure in this manner, the tape measure is provided with a belt clip.

A typical belt holder for a tape measure in the related art has an integrated form of a holder body mounted on a belt and a holding part in which a clip-through hole through which a belt clip of the tape measure passes is formed in a vertical direction in order to hold the tape measure by hanging the same. Such typical belt holder for the tape measure allows the worker to freely use both hands when the tape measure is held by hanging the belt clip of the tape measure on the holding part and to freely use the tape measure by removing the tape measure from the belt at any time when the tape measure is needed.

However, when the tape measure is held using the typical belt holder for the tape measure, there is a problem that the tape measure is easily removed from the belt holder for the tape measure when the worker moves vigorously.

On the other hand, unlike the typical belt holder for the tape measure, a belt holder for a tape measure of a special form has been often developed and commercially available, in which the tape measure is fixed in a locked state when the tape measure is inserted into the belt holder, and the tape measure is not removed unless a separate unlocking device is operated.

Such belt holder for tape measure of the special type is always in a locked state so long as the worker holds the tape measure on the belt holder, there is an advantage that the tape measure is not removed from the belt holder despite the user's vigorous movement or external force.

However, the belt holder for the tape measure of the special type is troublesome in that it is always required to release the locked state by operating the unlocking device even when the worker makes non-vigorous movements having no risk of removing the tape measure from the belt holder. In addition, there is a problem that a dedicated bracket suitable for the belt holder for the tape measure of the special type must be provided on the tape measure.

SUMMARY

Accordingly, the present invention has been made keeping in mind the above problems occurring in the related art, and the present invention has an object to provide a belt holder for a tape measure, which is used in any one mode selected from a mode in which the tape measure is easily held and removed without any additional operation and, a mode in which the tape measure is removed only when the user releases the locked state using an unlocking part, upon holding the tape measure with the existing belt clip.

In order to achieve the above object, the present invention provides a belt holder for a tape measure that is mounted on a belt to hold the tape measure having a belt clip by hanging the tape measure, the belt holder including: a holder body mounted on the belt; a rotatable holding part having a clip-through hole through which the belt clip of the tape measure passes formed in a vertical direction and rotatably coupled to a front surface of the holder body in order to hold the tape measure by hanging the tape measure; a locking bracket having a locking jaw formed to prevent the belt clip from being removed from the clip-through hole of the rotatable holding part that is rotated with respect to the holder body and slidably provided in the holder body; and a restoring spring resiliently supporting the locking bracket so that the locking jaw of the locking bracket is positioned to prevent the belt clip from being removed, wherein the belt holder for the tape measure is used in a holding mode of inserting or removing the belt clip of the tape measure into or from the clip-through hole in a state that the rotatable holding part is vertically upright and a locking mode of allowing the locking jaw to be positioned on an upper portion of the clip-through hole in a state that the rotatable holding part is rotated from the vertical upright state.

The belt holder may further include an unlocking part provided on the holder body to move the locking bracket so that the locking jaw of the locking bracket moves to a position that allows the belt clip not to be prevented from being removed.

In addition, the holder body and the rotatable holding part may be provided with a spring protrusion and the other may be provided with a protrusion insertion groove into which the spring protrusion is inserted so that the rotatable holding part is resiliently held in a holding mode position or a locking mode position.

In addition, the rotatable holding part may have a pair of resilient fixing pieces provided in a form of leaf spring to hold both lateral sides of the belt clip inserted into the clip-through hole.

In addition, the locking jaw may be provided with a holding part-contact-inclined portion that is in contact with the rotatable holding part so that the locking bracket moves into the holder body when the rotatable holding part rotates.

As described above, according to the belt holder for the tape measure according to the present invention, it is possible to use the belt holder for the tape measure in any one mode selected from a mode in which the user can easily remove the tape measure at any time by inserting the tape clip of the tape measure into the clip-through hole while making the rotatable holding part vertically upright, and a mode in which the user allows the tape measure to be coupled to the belt holder for the tape measure by rotating the rotatable holding part from the vertical state and to be removed by operating the unlocking part.

In other words, when performing a very simple operation having no risk of the tape measure being removed, the tape measure can be easily held and removed without any special operation. In addition, when performing a high-level work having a risk of the tape measure being removed, the tape measure can be carried safely by holding the tape measure in a locked state.

In addition, unlike the belt holder for the tape measure of the special type, the present invention has an advantage that any tape measure having a general belt clip in the related art can be easily held.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION

Figure 1:
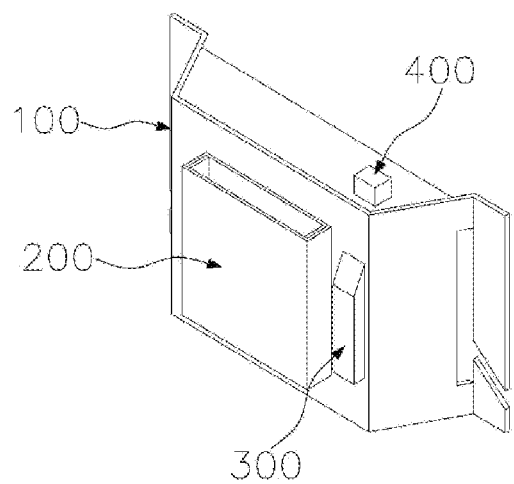
FIG. 1 is a perspective view of a belt holder for a tape measure according to an embodiment of the present invention.

Hereinafter, embodiments of the present invention will be described in detail with reference to the accompanying drawings so that those skilled in the art can easily carry out the present invention. The present invention may, however, be embodied in many different forms and should not be construed as limited to the embodiments set forth herein. In order to clearly illustrate the present invention in the drawings, portions not related to the description are omitted, and like reference numerals are given to similar portions throughout the specification. Whenever a part is referred to as "including" a component throughout the specification, it is to be understood that the part may include other component, not the exclusion of any other component, unless the context clearly dictates otherwise.

Figure 2:
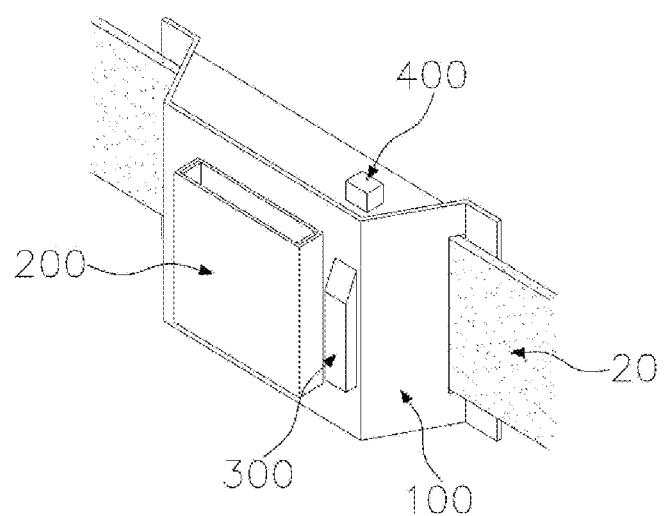
FIG. 2 is a view showing a state in which the belt holder for the tape measure of FIG. 1 is mounted on a belt.
Figure 3:
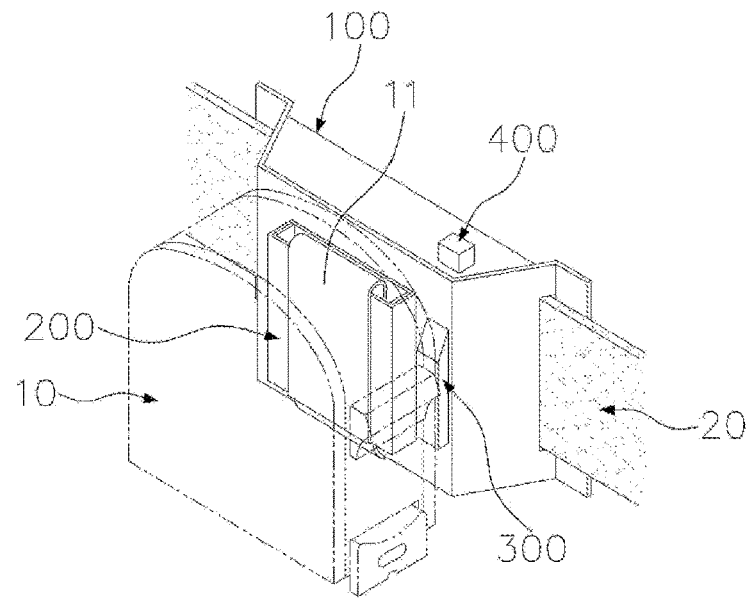
FIG. 3 is a view showing a state in which a tape measure is held on the belt holder of tape measure of FIG. 2.
Figure 4:
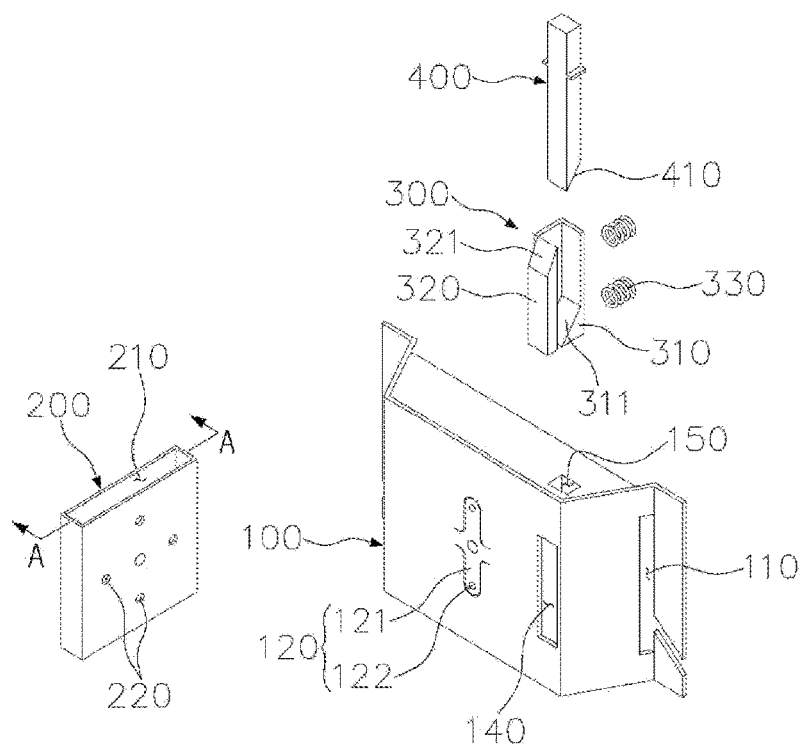
FIG. 4 is a view showing a rotatable holding part is removed from the belt holder for the tape measure of FIG. 1.
Figure 5:
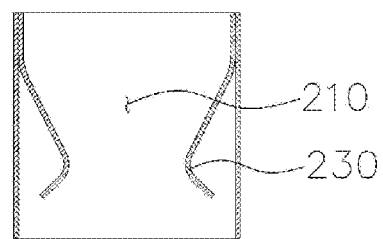
FIG. 5 is a cross-sectional view taken along a line A-A of the rotatable holding part of FIG. 4.
Figure 6:
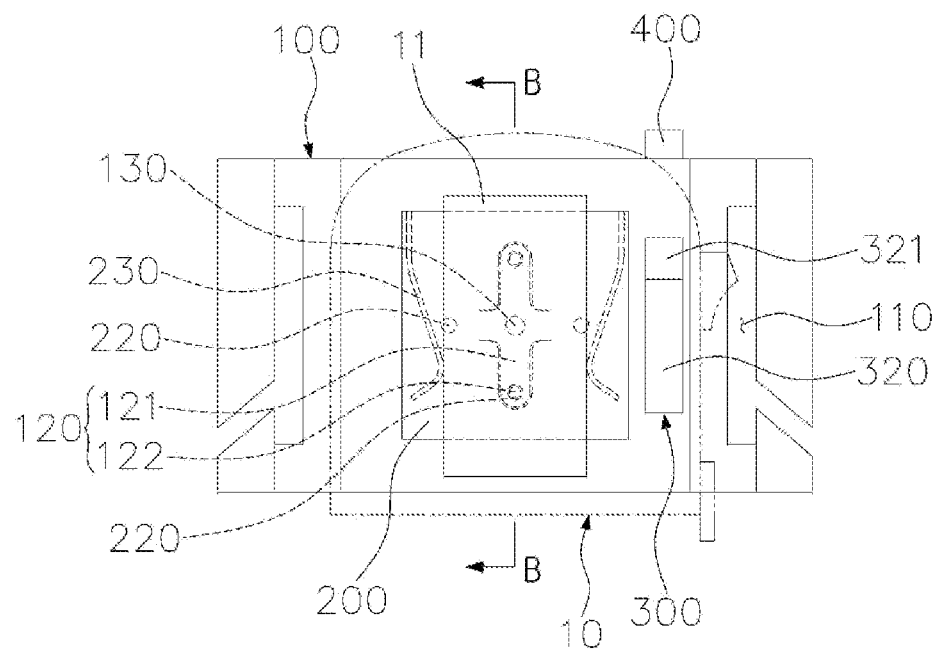
FIG. 6 is a conceptual view showing a state in which the belt holder for the tape measure of FIG. 1 is used in a holding mode.
Figure 7:
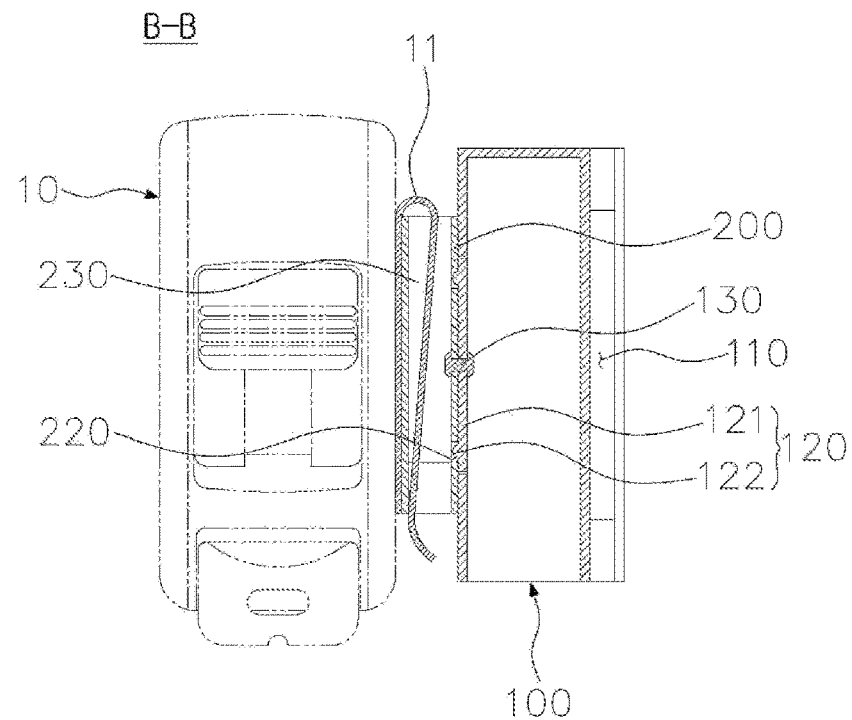
FIG. 7 is a cross-sectional view taken along a line B-B in FIG. 6.
Figure 8:
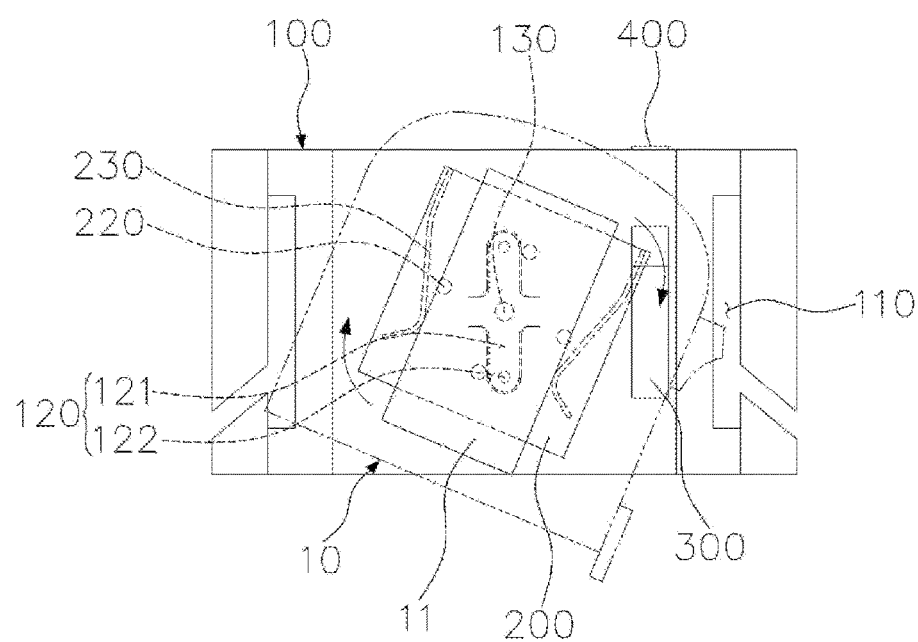
FIG. 8 is a conceptual view showing a process of switching the belt holder for the tape measure of FIG. 6 from a holding mode to a locking mode.
Figure 9:
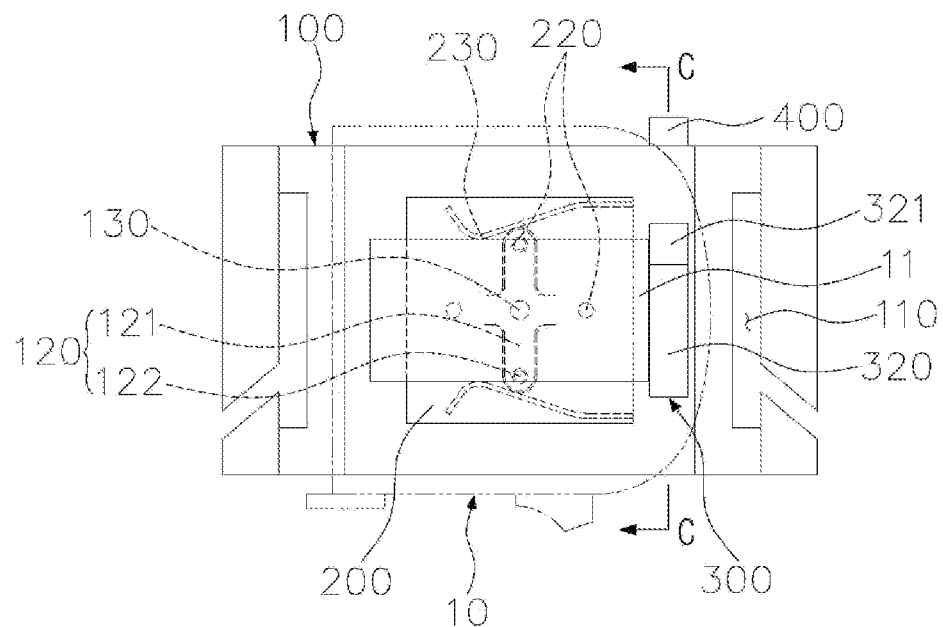
FIG. 9 is a conceptual view showing a state in which the belt holder for the tape measure of FIG. 1 is used in a locking mode.
Figure 10:
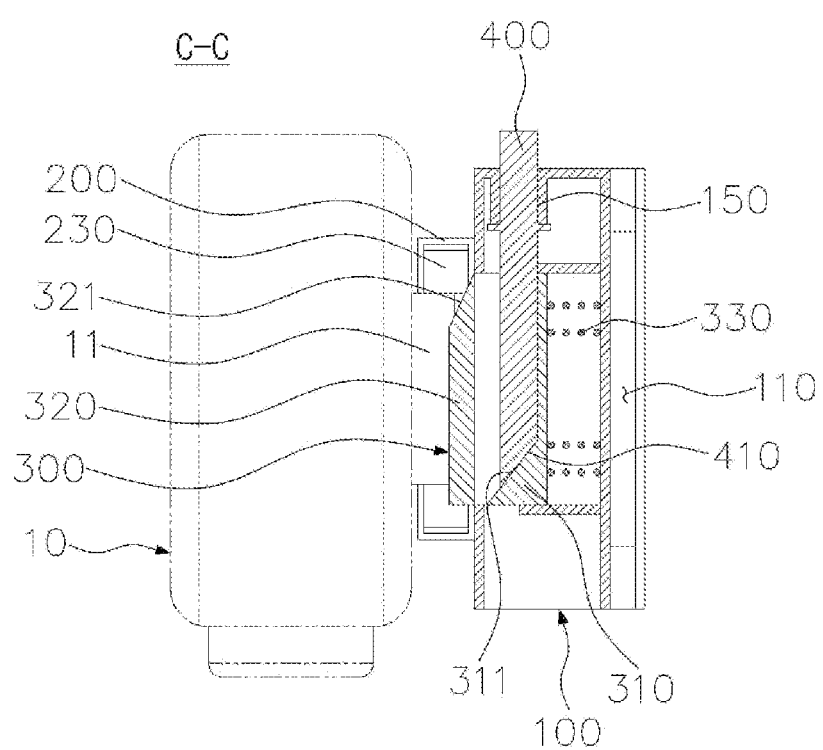
FIG. 10 is a conceptual cross-sectional view taken along a line C-C in FIG. 9.
Figure 11:
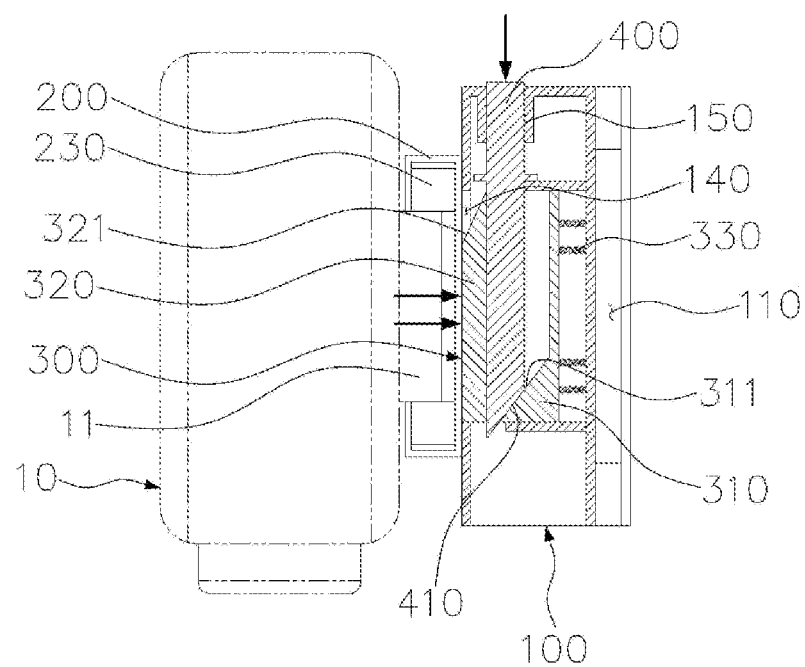
FIG. 11 is a view showing a state in which the unlocking part is pressed compared with the cross-sectional view of FIG. 10.

FIG. 1 is a perspective view of a belt holder for a tape measure according to an embodiment of the present invention; FIG. 2 is a view showing a state in which the belt holder for the tape measure of FIG. 1 is mounted on a belt; FIG. 3 is a view showing a state in which a tape measure is held on the belt holder of tape measure of FIG. 2; FIG. 4 is a view showing a rotatable holding part is removed from the belt holder for the tape measure of FIG. 1; FIG. 5 is a cross-sectional view taken along the line A-A of the rotatable holding part of FIG. 4; FIG. 6 is a conceptual view showing a state in which the belt holder for the tape measure of FIG. 1 is used in a holding mode; FIG. 7 is a cross-sectional view taken along a line B-B in FIG. 6; FIG. 8 is a conceptual view showing a process of switching the belt holder for the tape measure of FIG. 6 from a holding mode to a locking mode; FIG. 9 is a conceptual view showing a state in which the belt holder for the tape measure of FIG. 1 is used in a locking mode; FIG. 10 is a conceptual cross-sectional view taken along a line C-C in FIG. 9; and FIG. 11 is a view showing a state in which the unlocking part is pressed compared with the cross-sectional view of FIG. 10.

A belt holder for a tape measure according to an embodiment of the present invention is provided to hold the existing tape measure 10 having a belt clip 11 by hanging the tape measure 10 on a belt 20 and is configured to include a holder body 100, a rotatable holding part 200, a locking bracket 300, and an unlocking part 400.

The belt holder for the tape measure according to this embodiment may be used in any one mode selected from a holding mode in which the tape measure 10 is simply held and freely removed and a locking mode in which the tape measure 10 is not removed by switching the tape measure from a holding state to a locked state.

The holder body 100 is mounted on the belt 20 in a fixed manner and is provided with a belt engaging part that is to be mounted on the belt 20.

The belt engaging part according to this embodiment is a belt-through hole 110 formed in a slit shape on both sides in the left and right directions of the holder body 100. The belt-through hole 110 of the holder body 100 is partially cut into a 'C' shape. This is to allow the belt-through hole 110 to be stretched according to the thickness or the width of the belt 20, so that the holder body 100 may be easily coupled to the belt 20. The engaging structure of the belt engaging portion and the belt 20 may be changed according to the embodiment.

The rotatable holding part 200 is to hold the tape measure 10 by inserting the belt clip 11 of the tape measure 10 therein. The rotatable holding part 200 is rotatably coupled to the front portion of the holder body 100. More specifically, the center of the rear portion of the rotatable holding part 200 is rotatably coupled to the center of the front portion of the holder body 100 using the rotation shaft 130. The engagement of the rotatable holding part 200 and the holder body 100 using the rotation shaft 130 may be seen in FIG. 7. Various techniques may be applied to the engagement of the rotatable holding part 200 and the holder body 100 in a rotatable manner.

In the rotatable holding part 200, a clip-through hole 210 through which the belt clip 11 of the tape measure 10 passes is formed in the vertical direction. Specifically, when the belt clip 11 of the tape measure 10 is inserted vertically downward from the top of the clip-through hole 210, the tape measure 10 is held on the rotatable holding part 200.

In the rotatable holding part 200, a form of the holding part used in the typical belt holder for the tape measure may be adopted.

A pair of resilient fixing pieces 230 in the form of leaf spring is provided in order to hold the belt clip 11 passing through the clip-through hole 210 to be inserted into the rotatable holding part 200 on both sides of the belt clip 11 in left and right directions. The resilient fixing pieces 230 serve to hold the belt clip 11 to the rotatable holding part 200 regardless of the size of the belt clip 11 inserted into the rotatable holding part 200.

That is, even when the width of the belt clip 11 is narrow or wide, the resilient fixing pieces 230 are deformed so that the belt clip 11 is fixed.

The resilient fixing pieces 230 in the form of leaf spring are fixed to the inner upper portion of the rotatable holding part 200 only at the upper end. When the belt clip 11 is inserted into the rotatable holding part 200, the lower ends of the pair of resilient fixing pieces 230 are separated from each other so that the belt clip 11 is received regardless of the width of the belt clip 11.

The direction the clip-through hole 210 is facing may be changed by rotating the rotatable holding part 200 with respect to the holder body 100. More specifically, the clip-through hole 210 may be vertically upright so as to face upward, or may be rotated from the vertical state to be inclined or placed horizontally.

In order to hold the rotatable holding part 200 in a state that the rotatable holding part 200 is vertically upright or rotated, a spring protrusion 120 and a protrusion inserting groove 220 are provided in a portion in which the holder body 100, and the rotatable holding part 200 face each other.

The spring protrusion 120 has a structure in which a protrusion 122 protrudes from a leaf spring 121. The leaf spring 121 for the spring protrusion 120 has a cutting surface formed on the surface of the holder body 100 facing the rotatable holding part 200 to provide a cantilever structure.

The protrusion insertion groove 220 is a concave groove into which the protrusion 122 of the spring protrusion 120 is inserted. The protrusion insertion grooves 220 are formed in each of a portion where the protrusion 122 is in contact with the rotatable holding part 200 in a state that the rotatable holding part 200 is vertically upright and a portion where the protrusion 122 is in contact with the rotatable holding part 200 in a state where the rotatable holding part 200 is rotated.

According to this embodiment, in order to hold the rotatable holding part 200 flexibly in the vertical electing state (holding mode) and the 90 degree rotated position (locking mode), two spring protrusions 120 are provided at the 12 o'clock position and the 6 o'clock position of the front surface of the holder body 100, respectively, and two pairs of protrusion insertion grooves 220 are provided at the 12 o'clock and 6 o'clock positions and the 3 o'clock and 9 o'clock positions of the rear surface of the rotatable holding part 200, respectively.

The belt holder for the tape measure may be used in holding mode by allowing the rotatable holding part 200 to be upright vertically.

In other words, according to the belt holder for the tape measure of the present invention, it is possible to hold the tape measure 10 easily by inserting the belt clip 11 of the tape measure 10 into the clip-through hole 210, and remove the tape measure 10 by pulling out the belt clip 11 from the clip-through hole 210 without any additional operation.

When the rotatable holding part 200 is rotated from the vertical state (rotated 90 degrees in this embodiment) in a state that the belt clip 11 of the tape measure 10 is inserted into the clip-through hole 210 of the rotatable holding part 200, it is possible to be switched to a locking mode in which the belt clip 11 is not removed from the rotatable holding part 200.

A locking bracket 300 for preventing the belt clip 11 inserted into the clip-through hole 210 from being removed from the clip-through hole 210 is slidably provided in the holder body 100.

The locking bracket 300 includes a locking jaw 320. The locking jaw 320 protrudes from the holder body 100 and thus blocks an upper portion of the clip-through hole 210 of the rotatable holding part 200 in a state in which the rotatable holding part 200 is rotated. That is, the locking jaw 320 of the locking bracket 300 blocks the upper portion of the clip-through hole 210 to prevent the tape measure 10 from being removed from the rotatable holding part 200. The locking bracket 300 is configured to include a bracket body 310 slidably provided in the holder body 100 and a locking jaw 320 protruding from the bracket body 310 to the front surface of the holder body 100.

In addition, the locking bracket 300 further includes a restoring spring 330 for elastically supporting the locking bracket 300 so that the locking jaw 320 is positioned to avoid the removal of the belt clip 11.

In this embodiment, the restoring spring 330 elastically presses the bracket body 310 so that the locking jaw 320 protrudes from the front surface of the holder body 100.

A locking jaw through-hole 140 is provided in the holder body 100 so that the locking jaw 320 of the locking bracket 300 protrudes from the front surface of the holder body 100. The locking jaw through-hole 140 is provided to extend vertically on one side in the left and right direction of the front surface of the holder body 100.

The locking jaw 320 protruding through the locking jaw through-hole 140 is provided to extend vertically so as to correspond to the locking jaw-through hole 140. A holding part-contact-inclined portion 321 which is gently inclined toward the front surface of the holder body 100 is provided in the upper portion of the locking jaw 320, so that the rotatable holding part 200 is brought into contact with the locking jaw 320 to push the locking jaw 320 into the holder body 100 when rotating the rotatable holding part 200.

When a user rotates the rotatable holding part 200 in a state that the belt clip 11 of the tape measure 10 is inserted into the clip-through hole 210 of the rotatable holding part 200, since the locking jaw 320 is pushed into the holder body 100 while the edge of the rotatable holding part 200 passes the holding part-contact-inclined portion 321, the locking jaw 320 does not interrupt the rotation of the rotatable holding part 200.

When the user rotates the rotatable holding part 200 by 90 degrees so that the upper portion of the clip-through hole 210 is directed toward the 3 o'clock position, the locking jaw 320 inserted into the holder body 100 by the rotatable holding part 200 does not interfere with the rotatable holding part 200 and thus protrudes again from the front surface of the holder body 100 due to the restoring spring 330.

The locking jaw 320 protruding from the front surface of the holder body 100 blocks the upper portion of the clip-through hole 210 of the rotatable holding part 200, thereby preventing the belt clip 11 from being removed from the clip-through hole 210.

The locking jaw 320 is inserted into the holder body 100 only when the rotatable holding part 200 vertically upright is rotated toward the 3 o'clock position because the holding part-contact-inclined portion 321 is provided at the upper portion of the locking jaw 320.

The belt holder for the tape measure according to the present embodiment further includes an unlocking part 400. The locking jaw 320 is pushed in so that the rotatable holding part 200 is vertically upright only when the unlocking part 400 is operated. In this embodiment, the unlocking part 400 is implemented in the form of an unlocking button, but the unlocking part 400 may be implemented in various forms.

As described above, in the present embodiment, the switching to the locking mode can be performed easily, and the switching from the locking mode to the holding mode can be performed only when the unlocking part 400 is operated, whereby it is possible to prevent the mode from switching due to a user's mistake.

Meanwhile, a first inclined contact portion 311 is provided in the bracket body 310 of the locking bracket 300, so that the locking jaw 320 of the locking bracket 300 is pushed into the holder body 100 using an unlocking part 400.

In addition, a second inclined contact portion 410 which is in contact with the first inclined contact portion 311 to move the locking bracket 300 from the front to the rear of the holder body 100 is provided at the lower end of the unlocking part 400.

The unlocking part 400 is provided so that the second inclined contact portion 410 thereof is in contact with the first inclined contact portion 311 of the locking bracket 300 while passing through the unlocking button-through hole 150 formed in the upper surface of the holder body 100.

When the top portion of the unlocking part 400 is pushed downward, the second inclined contact portion 410 is slid along the first inclined contact portion 311 of the locking bracket 300 to move the locking bracket 300 rearward.

The manner in which the first inclined contact portion 311 of the locking bracket 300 and the second inclined contact portion 410 of the unlocking part 400 are operated is only an example and may be varied according to the embodiment.

The belt holder for the tape measure according to an embodiment of the present invention may be used in a holding mode of holding the tape measure 10 by inserting the belt clip 11 of the tape measure 10 into the rotatable holding part 200 or easily removing the tape measure 10, in a state that the rotatable holding part 200 is vertically upright with respect to the holder body 100.

In the case that the user frequently needs to use the tape measure 10, when the user uses the belt holder for the tape measure in the holding mode, it is convenient because the user does not need to operate the unlocking part 400 every time the user tries to use the tape measure 10.

The belt holder for the tape measure according to an embodiment of the present invention may be used in a locking mode in which the locking jaw 320 is positioned in the upper portion of the clip-through hole 210 by rotating the rotatable holding part 200 from the vertical state. Specifically, the rotatable holding part 200 is rotated by 90 degrees in a state that the belt clip 11 of the tape measure 10 is inserted into the rotatable holding part 200 so that the locking jaw 320 is positioned in the upper portion of the belt clip 11 of the tape measure 10, whereby the locking jaw 320 prevents the belt clip 11 from being removed.

When there is a risk that the user moves so violently that the tape measure 10 will be removed from the belt holder for the tape measure, the tape measure 10 will be prevented from unintentionally being removed from the belt holder for the tape measure by using the belt holder for the tape measure in the locking mode.

Switching of the belt holder from the holding mode to the locking mode is done simply by gripping the tape measure 10 held on the rotatable holding part 200 with hand and then rotating the same by 90 degrees.

In order to switch the belt holder from the locking mode to the holding mode, the user presses the unlocking part 400 and then rotates the rotatable holding part 200 so that the rotatable holding part 200 is vertically upright, whereby it is possible to reliably prevent the tape measure 10 from being removed from the belt holder for the tape measure.

While the present invention has been described in connection with what is presently considered to be the most practical and preferred embodiment, it is to be understood that the invention is not limited to the disclosed embodiments.

For example, a stopper or the like may be separately provided to define the rotation path of the rotatable holding part. That is, a rotating range of the rotatable holding part is preferably limited only by the holding mode and the locking mode.

It will be understood by those of ordinary skill in the art that various changes in form and details may be made therein without departing from the spirit and scope of the present invention as defined by the following claims.

It is therefore to be understood that the above-described embodiments are illustrative in all aspects but are not restrictive. For example, each component described as a single entity may be distributed and implemented, and components described as being distributed may also be implemented in a combined form.

The scope of the present invention is defined by the appended claims rather than the detailed description and all changes or modifications derived from the meaning and scope of the claims and their equivalents are to be construed as being included within the scope of the present invention.

What is claimed is:

1. A belt holder for a tape measure that is mounted on a belt to hold the tape measure having a belt clip by hanging the tape measure, the belt holder comprising:
    a holder body mounted on the belt;
    a rotatable holding part having a clip-through hole through which the belt clip of the tape measure passes formed in a vertical direction and rotatably coupled to a front surface of the holder body in order to hold the tape measure by hanging the tape measure;
    a locking bracket having a locking jaw formed to prevent the belt clip from being removed from the clip-through hole of the rotatable holding part that is rotated with respect to the holder body and slidably provided in the holder body; and
    a restoring spring resiliently supporting the locking bracket so that the locking jaw of the locking bracket is positioned to prevent the belt clip from being removed,
    wherein the belt holder for the tape measure is used in a holding mode of inserting or removing the belt clip of the tape measure into or from the clip-through hole in a state that the rotatable holding part is vertically upright and a locking mode of allowing the locking jaw to be positioned on an upper portion of the clip-through hole in a state that the rotatable holding part is rotated from the vertical upright state.

2. The belt holder of claim 1, further comprising:
    an unlocking part provided on the holder body to move the locking bracket so that the locking jaw of the locking bracket moves to a position that allows the belt clip not to be prevented from being removed.

3. The belt holder of claim 2, wherein one of the holder body and the rotatable holding part is provided with a spring protrusion and the other is provided with a protrusion insertion groove into which the spring protrusion is inserted so that the rotatable holding part is resiliently held in a holding mode position or a locking mode position.

4. The belt holder of claim 2, wherein the rotatable holding part has a pair of resilient fixing pieces provided in a form of leaf spring to hold both lateral sides of the belt clip inserted into the clip-through hole.

5. The belt holder of claim 2, wherein the locking jaw is provided with a holding part-contact-inclined portion that is in contact with the rotatable holding part so that the locking bracket moves into the holder body when the rotatable holding part rotates.

* * * * *